(12) United States Patent
Berwanger

(10) Patent No.: US 9,365,194 B2
(45) Date of Patent: Jun. 14, 2016

(54) DRUM BRAKE S-CAM HAVING OFFSET CAM FOLLOWERS

(71) Applicant: Bendix Spicer Foundation Brake LLC, Elyria, OH (US)

(72) Inventor: Fred W. Berwanger, Edwardsburg, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/530,713

(22) Filed: Nov. 1, 2014

(65) Prior Publication Data

US 2016/0121858 A1   May 5, 2016

(51) Int. Cl.
  *F16D 51/22*   (2006.01)
  *F16D 65/22*   (2006.01)
  *B60T 1/06*    (2006.01)

(52) U.S. Cl.
  CPC ............ *B60T 1/067* (2013.01); *F16D 51/22* (2013.01); *F16D 65/22* (2013.01)

(58) Field of Classification Search
  CPC ......... F16D 51/16; F16D 51/18; F16D 51/20; F16D 51/22; F16D 65/08; F16D 65/09; F16D 65/091; F16D 65/022
  See application file for complete search history.

(56) References Cited

U.S. PATENT DOCUMENTS

| 1,514,054 A |   | 11/1924 | Lancia |   |
|---|---|---|---|---|
| 1,557,034 A | * | 10/1925 | Delegard | F16D 51/22 188/79.58 |
| 1,650,257 A |   | 11/1927 | Bendix |   |
| 1,657,852 A | * | 1/1928 | Bendix | F16D 65/08 188/250 F |
| 1,756,996 A |   | 5/1930 | Sanford |   |
| 1,962,658 A |   | 6/1934 | Huck |   |
| 2,852,106 A | * | 9/1958 | Cull, Jr. | F16D 65/22 188/330 |
| 3,096,856 A | * | 7/1963 | Burnett | F16D 65/22 188/332 |
| 3,196,987 A | * | 7/1965 | Menter | F16D 65/22 188/330 |
| 3,346,077 A |   | 10/1967 | Cumming |   |
| 3,368,648 A |   | 2/1968 | Brownyer |   |
| 3,677,374 A |   | 7/1972 | Newstead et al. |   |

(Continued)

FOREIGN PATENT DOCUMENTS

| CN | 203114957 U | 8/2013 |   |
|---|---|---|---|
| EP | 0270758 A2 * | 6/1988 | ............... F16D 51/22 |

(Continued)

OTHER PUBLICATIONS

Machine translation of CN 203114957 U (obtained from European Patent Office website).

(Continued)

*Primary Examiner* — Anna Momper
(74) *Attorney, Agent, or Firm* — Reising Ethington P.C.

(57) ABSTRACT

A drum brake is provided that improves the direction of the actuating forces to reduce stress, improve efficiency and permit thicker brake linings. First and second brake shoes each have a first end pivotally coupled to the same or different anchor pins on a brake spider. First and second cam followers are disposed at corresponding second ends of the brake shoes. A cam engages the cam followers with movement of the cam causing the brake shoes to move between positions of engagement and disengagement with a braking surface. The cam followers are offset such that distances between the centers of the first cam followers and the anchor pin or pins supporting the brake shoes differ so as to improve the direction of the cam force vector.

25 Claims, 3 Drawing Sheets

(56) References Cited

U.S. PATENT DOCUMENTS

| | | | |
|---|---|---|---|
| 4,180,898 | A | 1/1980 | Camph et al. |
| RE31,531 | E | 3/1984 | Williams |
| 4,494,633 | A | 1/1985 | Idesawa |
| 5,273,138 | A | 12/1993 | White |
| 5,310,028 | A | 5/1994 | Sampson |
| 5,398,790 | A | 3/1995 | McNinch, Jr. |
| 5,435,419 | A | 7/1995 | Muzzy |
| 7,044,275 | B2 | 5/2006 | Maehara |
| 7,175,009 | B2 | 2/2007 | Clark et al. |
| 7,178,643 | B2 | 2/2007 | Maehara et al. |
| 2012/0031716 | A1 | 2/2012 | Flodin et al. |
| 2014/0116819 | A1 | 5/2014 | Berwanger |
| 2015/0167765 | A1* | 6/2015 | Plantan .................. F16D 51/28 188/332 |

FOREIGN PATENT DOCUMENTS

| | | |
|---|---|---|
| GB | 1306229 A | 2/1973 |
| GB | 2064687 A | 6/1981 |
| GB | 2066910 A | 7/1981 |
| JP | 3860048 B2 | 9/2002 |

OTHER PUBLICATIONS

English language abstract of CN 203114957 U (obtained from European Patent Office website).
Machine translation of JP 3860048 B2 (obtained from Japanese Patent Office website).
English language abstract of JP 3860048 B2.
Office Action issued in U.S. Appl. No. 14/530,715 (Nov. 6, 2015).
Office Action issued in U.S. Appl. No. 14/530,712 (Dec. 29, 2015).
International Search Report issued in International (PCT) Patent Application No. PCT/US2015/057048 Feb. 18, 2016).
Written Opinion issued in International (PCT) Patent Application No. PCT/US2015/057048 (Feb. 18, 2016).
International Search Report issued in International (PCT) Patent Application No. PCT/US2015/057052 (Feb. 17, 2016).
Written Opinion issued in International (PCT) Patent Application No. PCT/US2015/057052 (Feb. 17, 2016).
Office Action issued in U.S. Appl. No. 14/530,715 (Feb. 18, 2016).
International Search Report issued in corresponding International (PCT) Patent Application No. PCT/US2015/057051 (Mar. 1, 2016).
Written Opinion issued in corresponding International (PCT) Patent Application No. PCT/US2015/057051 (Mar. 1, 2016).

* cited by examiner

DRUM BRAKE S-CAM HAVING OFFSET CAM FOLLOWERS

BACKGROUND OF THE INVENTION a. Field of the Invention

This invention relates to vehicle brakes. In particular, the invention relates to a drum brake in which the brake actuating means engages the brake shoes at offset positions to improve the direction of the brake actuating forces.

b. Background Art

Referring to FIG. 1, a conventional prior art drum brake 10 is illustrated. In a conventional drum brake, a drum 12 rotates with a wheel or wheels proximate to one end of an axle. The drum 12 defines a radially inner braking surface 14. A brake spider 16 is disposed about the axle and a pair of brake shoes 18, 20 are pivotally mounted at one end to the brake spider 16. The opposite end of each brake shoe 18, 20 is engaged by an actuating member such as a cam 22 to move the brake shoes 18, 20 between positions of engagement and disengagement with the braking surface of the brake drum.

In a conventional S-cam drum brake as shown in FIG. 1, rollers 24, 26, or cam followers, are disposed between the brake shoes 18, 20 and the cam 22 to transfer actuating forces from the cam 22 to the brake shoes 18, 20. Force is applied by the cam 22 through the rollers 24, 26 along the direction indicated by arrows 28, 30, respectively, which extend from a "power circle" of the cam 22 defined by a radius from the rotational axis of the generally involute cam 22. The force vector represented by arrows 28, 30 may be resolved into two components—a component represented by arrows 32, 34 comprising the effective brake actuation force tangent to the pivot arc of the corresponding brake shoe 18, 20 and a component represented by arrows 36, 38 comprising the divergence between the direction of the force exerted by the cam 22 on rollers 24, 26 and the effective brake actuation force.

The divergence between the actuating forces applied by the cam 22 and represented by arrows 28, 30 and the effective brake actuating force represented by arrows 32, 34 has several drawbacks. First, the force component represented by arrows 36, 38 creates mechanical stress in the webs of the brakes shoes 18, 20 and is particularly acute when the force component 36, 38 is directed outward in trailing brake shoes. The increased stress can lead to cracks in the brake shoe webs and costly downtime and repairs. Second, the actuation efficiency of the brake 10 is less than optimal because the effective brake actuation force is less than the force exerted by the cam 22. As a result, more fluid pressure is required to actuate the brake leading to relatively large air chambers in brake actuators and/or requiring brake linings with relatively high friction coefficients. Third, the amount of rotation of cam 22 and, therefore, the displacement of brakes shoes 18, 20, is relatively limited thereby limiting the potential thickness of the brake linings and requiring more frequent maintenance and/or repair.

The inventor herein has recognized a need for a brake that will reduce one or more of the above-identified deficiencies and/or provide improved performance.

BRIEF SUMMARY OF THE INVENTION

This invention relates to vehicle brakes. In particular, the invention relates to a drum brake in which the brake actuating means engages the brake shoes at offset positions to improve the direction of the brake actuating forces.

A brake in accordance with one embodiment of the invention includes a brake spider having a central aperture configured to receive an axle extending therethrough along a center axis of the central aperture. The brake further includes first and second brake shoes. Each of the first and second brakes shoes has a first end pivotally coupled to the brake spider. The first end of the first brake shoe and the first end of the second brake shoe are supported on an anchor pin extending from the brake spider. The brake further includes a first circular cam follower disposed at a second end of the first brake shoe, a second circular cam follower disposed at a second end of the second brake shoe and a cam in engagement with the first and second circular cam followers. Movement of the cam causes the first and second brake shoes to move between positions of engagement and disengagement with an associated braking surface. A distance from a center of the anchor pin to a center of the first cam follower is different from a distance from the center of the anchor pin to a center of the second cam follower.

A brake in accordance with another embodiment of the invention includes a brake spider having a central aperture configured to receive an axle extending therethrough along a center axis of the central aperture. The brake further includes first and second brake shoes. Each of the first and second brakes shoes has a first end pivotally coupled to the brake spider. The first end of the first brake shoe and the first end of the second brake shoe are supported on an anchor pin extending from the brake spider. The brake further includes means, in engagement with a second end of the first brake shoe and a second end of the second brake shoe, for moving the first and second brake shoes between positions of engagement and disengagement with an associated braking surface. A distance between a center of the anchor pin and a radially outermost point of engagement between the first brake shoe and the moving means is different from a distance between the center of the anchor pin and a radially outermost point of engagement between the second brake shoe and the moving means.

A brake in accordance with another embodiment of the invention includes a brake spider having a central aperture configured to receive an axle extending therethrough along a center axis of the central aperture. The brake further includes first and second brake shoes. Each of the first and second brakes shoes has a first end pivotally coupled to the brake spider. The first end of the first brake shoe is supported on a first anchor pin extending from the brake spider and the first end of the second brake shoe is supported on a second anchor pin extending from the brake spider. The brake further includes a first circular cam follower disposed at a second end of the first brake shoe, a second circular cam follower disposed at a second end of the second brake shoe and a cam in engagement with the first and second circular cam followers. Movement of the cam causes the first and second brake shoes to move between positions of engagement and disengagement with an associated braking surface. A distance from a center of the first anchor pin to a center of the first cam follower is different from a distance from the center of the second anchor pin to a center of the second cam follower.

A brake in accordance with another embodiment of the invention includes a brake spider having a central aperture configured to receive an axle extending therethrough along a center axis of the central aperture. The brake further includes first and second brake shoes. Each of the first and second brakes shoes has a first end pivotally coupled to the brake spider. The first end of the first brake shoe is supported on a first anchor pin extending from the brake spider and the first end of the second brake shoe is supported on a second anchor pin extending from the brake spider. The brake further includes means, in engagement with a second end of the first brake shoe and a second end of the second brake shoe, for moving the first and second brake shoes between positions of engagement and disengagement with an associated braking surface. A distance between a center of the first anchor pin and a radially outermost point of engagement between the first brake shoe and the moving means is different from a distance between the center of the second anchor pin and a radially outermost point of engagement between the second brake shoe and the moving means.

A brake in accordance with the invention represents an improvement as compared to conventional brakes. In particular, by adjusting the position of the cam followers and offsetting the cam followers, the force applied by the cam to the cam followers and brake shoes may be substantially tangent to the pivot arc of the brake shoes and reduces any divergence between the effective brake actuation force and the force applied by the cam. As a result, mechanical stress in the brake shoes webs is reduced as well as downtime and repair costs resulting from web cracking. The actuation efficiency of the brake is also increased enabling a reduction in the air chamber size for the brake actuator and/or the use of brake linings with lower coefficients of friction. The inventive brake also allows increased travel of the cam followers and allows the brake shoes to retract further thereby permitting the use of thicker brake linings and improving the life of the brake shoes.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
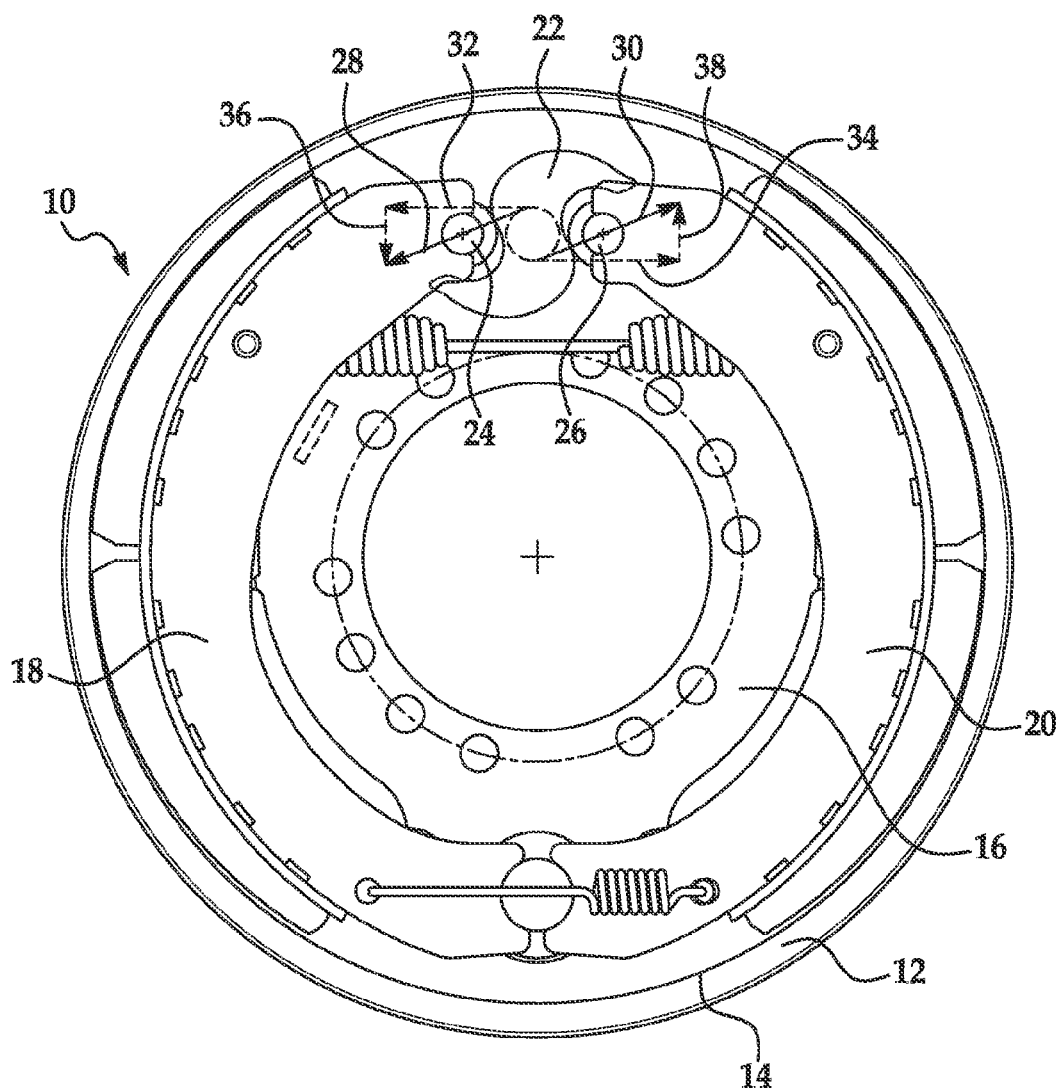
FIG. 1 is a plan view of a prior art brake.
Figure 2:
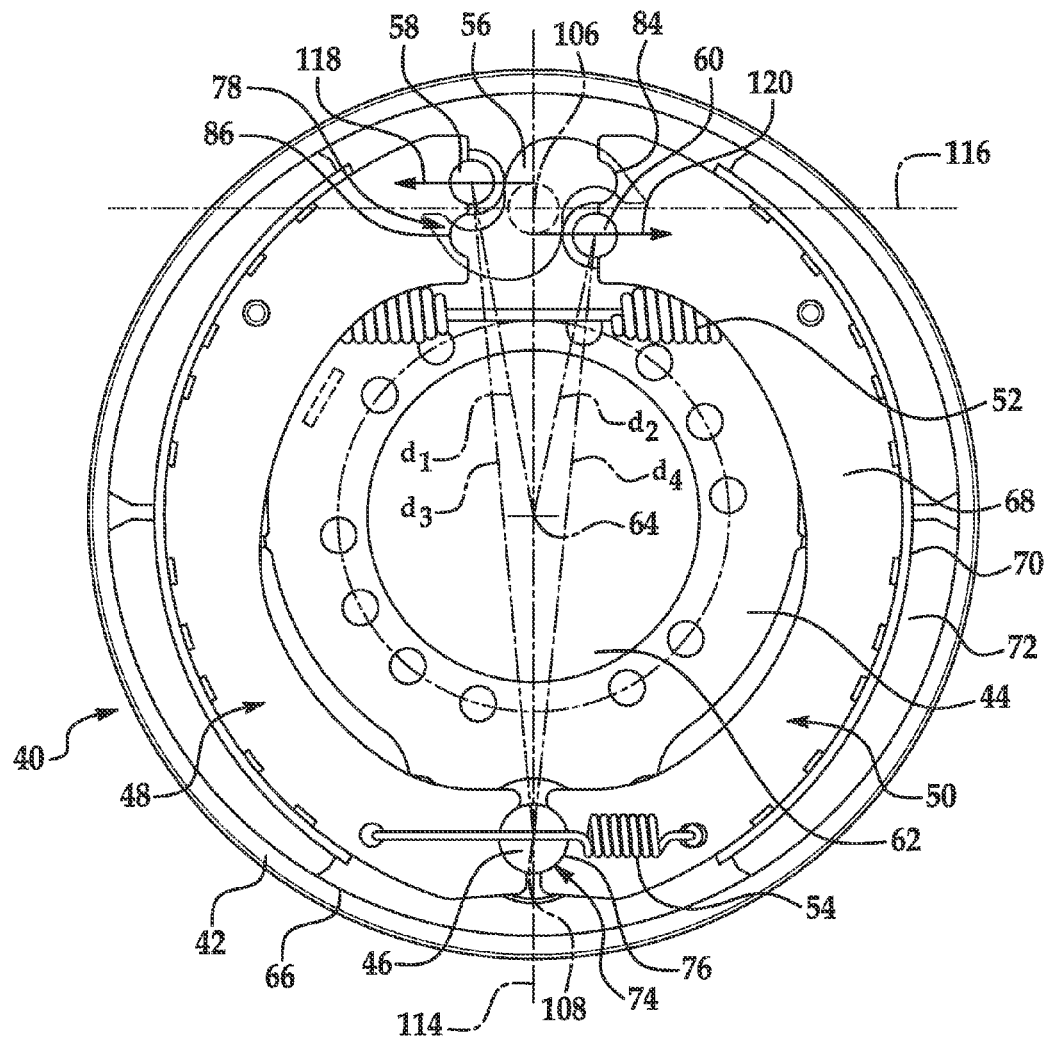
FIG. 2 is a plan view of a brake in accordance with one embodiment of the present teachings.

Referring now to the drawings wherein like reference numerals are used to identify identical components in the various views, FIG. 2 illustrates a brake 40 in accordance with one embodiment of the present invention. Brake 40 is provided to slow rotation of one or more vehicle wheels. Brake 40 is particularly adapted for use in heavy vehicles. It should be understood, however, that brake 40 may be used on a wide variety of vehicles and in non-vehicular applications. Brake 40 is configured to act against an annular brake drum 42 that rotates with the vehicle wheel or wheels at one end of an axle (not shown). Brake 40 may include a brake spider 44, one or more anchor pins 46, brake shoes 48, 50, return and retaining springs 52, 54, and means, such as cam 56 and rollers or cam followers 58, 60, for moving brake shoes 48, 50 between positions of engagement and disengagement with a braking surface.

Spider 44 is provided to mount the various components of brake 40. Spider 44 defines a central aperture 62 having a center axis 64 which may be coincident with the rotational axis of the vehicle wheel. The aperture 62 is configured to receive a vehicle axle extending therethrough and along axis 64. Spider 44 may further define bores (not shown) on either side of aperture 62 configured to receive anchor pin 46 and a camshaft (not shown) supporting cam 56.

Figure 3:
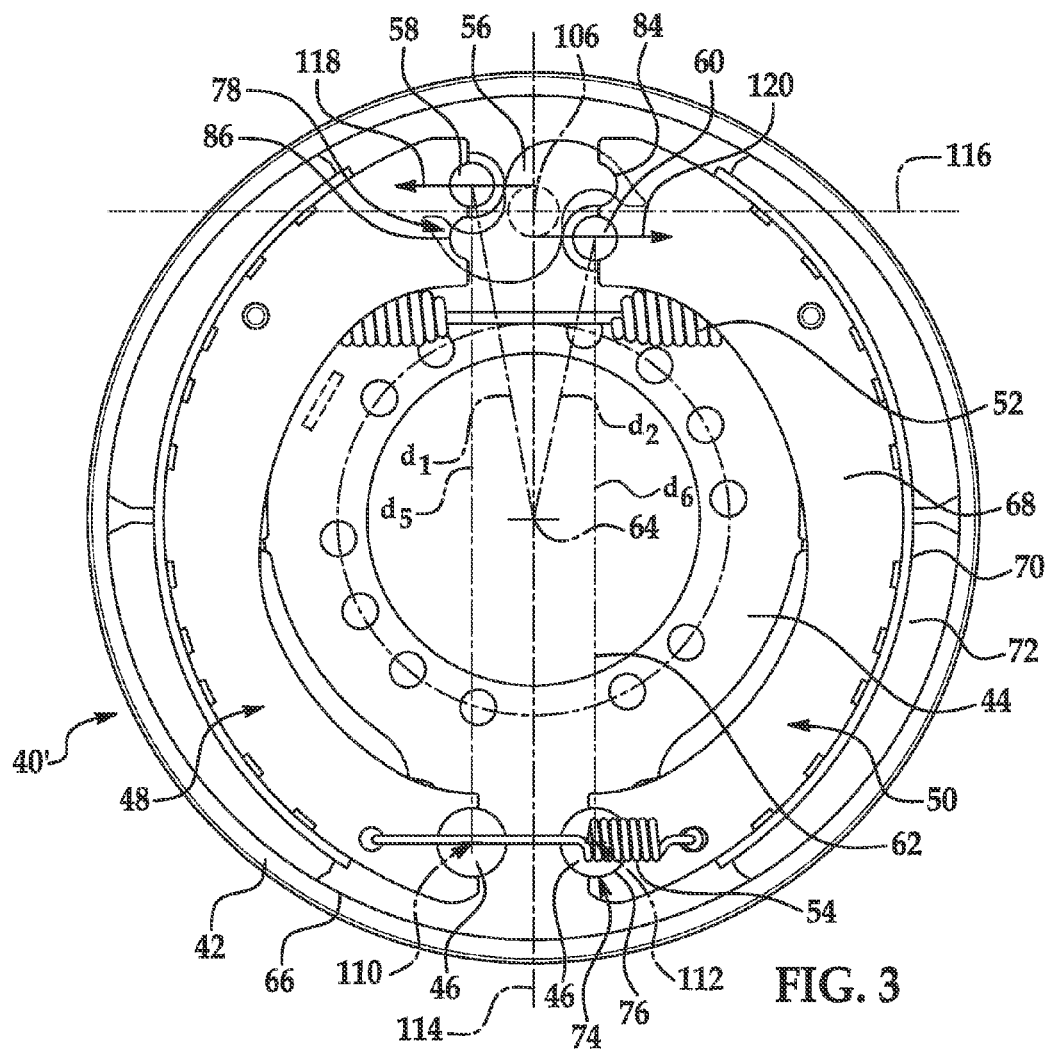
FIG. 3 is a plan view of a brake in accordance with another embodiment of the present teachings.

Anchor pin 46 is provided to pivotally mount brake shoes 48, 50 to brake spider 44. Anchor pin 46 may comprise a round pin and may be mounted on and extend from brake spider 44. Referring to FIG. 3, in an alternative embodiment, a brake 40' may include multiple anchor pins 46 with each of brake shoes 48, 50 pivotally coupled to a separate anchor pin 46.

Brake shoes 48, 50 are provided for selective engagement with a braking surface 66 of drum 42 in order to apply a braking torque to the drum and one or more vehicle wheels. Brake shoes 48, 50 may together comprise a brake shoe kit adapted for use in brake 40 or 40'. Brake shoes 48, 50 are supported on anchor pin(s) 46 and thereby pivotally coupled to spider 44 at one end. Each brake shoe 48, 50 may include one or more webs 68, a brake table 70, and one or more brake linings 72.

Figure 4:
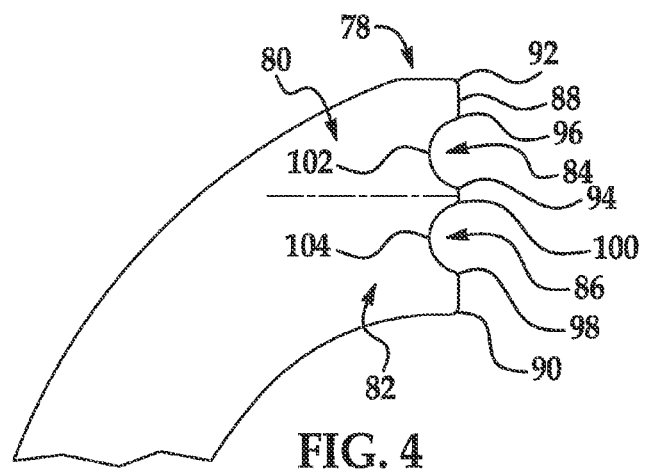
FIG. 4 is an enlarged view of one end of a web for a brake shoe in accordance with the present teachings.

Webs 68 support brake table 70. Webs 68 may also provide a connection point for return spring 52 and retaining spring 54. Webs 68 may be made from metals and metal alloys such as steel. Webs 68 are arcuate in shape and extend between opposite ends of brake shoes 48, 50. It should be understood that the number of webs 68 in each brake 48, 50 may vary and each brake shoe 48, 50 may therefore include a plurality of webs 68 that extend generally parallel to one another. Webs 68 may be secured to brake table 70 using welds or other conventional fastening means. Each web 68 may have one end 74 that defines a semicircular recess 76 configured to receive a corresponding anchor pin 46. In accordance with one aspect of the present teachings, the opposite end 78 of each web 68 may be configured to engage rollers 58, 60 at either of first and second radially offset positions. Referring to FIG. 4, end 78 of web 68 may be divided into a plurality of radially offset portions such as portions 80, 82. Each portion 80, 82 may be configured to engage a roller 58, 60 and thereby locate rollers 58, 60 at corresponding radially offset positions. For example, web 68 may define one more semicircular recesses 84, 86 configured to receive rollers 58, 60 with each portion 80, 82 including a corresponding recess 84, 86. End 78 of web 68 may further define a radially extending edge 88 having radially inner and outer ends 90, 92. Recesses 84, 86 may be formed along edge 88 and may be disposed between ends 90, 92 of edge 88. Recesses 84, 86 each define radially innermost and radially outermost points of engagement 94, 96 and 98, 100, respectively, for rollers 58, 60 and a radially center point of engagement 102, 104, respectively, approximately midway between the corresponding radially innermost and outermost points of engagement 94, 96 and 98, 100. Referring to FIGS. 2-3, rollers 58, 60 may be positioned such that roller 58 is received within recess 84 of web 68 of brake shoe 48 while roller 60 is received within recess 86 of web 68 of brake shoe 50. As a result, and with reference to FIG. 4, the distance in brake shoe 48 between the radially inner end 90 of edge 88 and the radially center point of engagement 102 of web 68 of brake shoe 48 and roller 58 is different than the distance in brake shoe 50 between the radially inner end 90 of edge 88 and the radially center point of engagement 104 of web 68 of brake shoe 50 and roller 60. Similarly, the distance in brake shoe 48 between the radially outer end 92 of edge 88 and the radially center point of engagement 102 of web 68 of brake shoe 48 and roller 58 is different than the distance in brake shoe 50 between the radially outer end 92 of edge 88 and the radially center point of engagement 104 of web 68 of brake shoe 50 and roller 60.

In the embodiments illustrated in FIGS. 2 and 3, the webs 68 of each brake shoe 48, 50 are identical in construction such that the webs 68 and brake shoes 48, 50 are interchangeable within brake 40 or 40'. In particular, each web 68 contains recesses 84, 86 with recess 84 disposed radially outward of recess 86. In an alternative embodiment, however, the web(s)

68 of brakes shoes 48, 50—and particularly the shape of ends 78 of brake webs 68—may differ. For example, the web(s) 68 of brake shoe 48 may include only one of recesses 84, 86—such as radially outer recess 84—while the web(s) 68 of brake shoe 50 include the other of recesses 84, 86—such as radially inner recess 86.

Brake table 70 is provided to support brake linings 72. Table 70 is supported on webs 68 and may be arcuate in shape. Table 70 may be made from conventional metals and metal alloys including steel.

Brake linings 72 are provided for frictional engagement with braking surface 66 of drum 42. Linings 72 may be made from conventional friction materials. Brake linings 72 are disposed on brake table 70 and may be secured to brake table 70 using a plurality of rivets or other conventional fasteners.

Return spring 52 is provided to bias brake shoes 48, 50 to a position of disengagement from the braking surface 66 of drum 42. Retainer springs 54 are provided to retain brake shoes 48, 50—and particularly webs 68—on anchor pin(s) 46. Springs 52, 54 are conventional in the art. The ends of spring 52 may engage pins (not shown) extending from webs 68 of brakes shoes 48, 50 while the ends of springs 54 extend through corresponding apertures in webs 68 of brake shoes 48, 50.

Cam 56, together with rollers 58, 60, provides an actuating assembly or means for moving brake shoes 48, 50 between positions of engagement with and disengagement from the braking surface 66 of the drum 42. In the illustrated embodiment, cam 56 comprises a doubled lobed S-cam that engages rollers 58, 60. Cam 56 is connected to one end of a camshaft (not shown) and rotates about a rotational axis 106 responsive to forces imposed by a brake actuator (not shown) on the camshaft.

Rollers 58, 60 are provided to transfer brake actuation forces from cam 56 to brake shoes 48, 50. Rollers 58, 60 are circular in cross-section and are configured to be received within recesses 84, 86 of webs 68 formed at end 78 of shoes 48, 50, respectively. Rollers 58, 60 engage webs 68 and cam 56 and follow the surface of the cam 56 as it rotates thereby causing shoes 48, 50 to pivot about a pivot axis 108 (FIG. 2) or axes 110, 112 (FIG. 3) defined at the center of anchor pins 46. In accordance with the present invention, rollers 58, 60 are offset from one another. A plane 114 contains both axis 64 and the rotational axis 106 of cam 56. Referring to FIG. 2, plane 114 may also contain the pivot axis 108 at the center of anchor pin 46. Alternatively, and with reference to FIG. 3, in embodiments where multiple anchor pins 46 are employed the pivot axes 110, 112 of the anchor pins 46 may be equidistant from plane 114 on either side of plane 114. Another plane 116 containing rotational axis 106 of cam 56 extends perpendicular to plane 114. The center of roller 58 is disposed on one side of plane 116 while the center of roller 60 is disposed on the other side of plane 116. Further, because rollers 58, 60 are offset from one another, a distance $d_1$ between axis 64 and the center of roller 58 is different than a distance $d_2$ between axis 64 and the center of roller 60. In the illustrated embodiment distance $d_1$ is greater than distance $d_2$. Similarly, and with reference to FIG. 2, a distance $d_3$ between the center of anchor pin 46 (i.e. pivot axis 108) and the center of roller 58 is different than a distance $d_4$ between the center of anchor pin 46 and the center of roller 60. In the illustrated embodiment distance $d_3$ is greater than distance $d_4$. Likewise, and with reference to FIG. 3, in a brake in which brake shoes 48, 50 are mounted on separate anchor pins 46 centered at points on either side of plane 114 and equidistant from plane 114, the distance $d_5$ between the center of the anchor pin 46 supporting brake shoe 48 and the center of roller 58 is also different than the distance $d_6$ between the center of the anchor pin 46 supporting brake shoe 50 and the center of roller 60. Although the distances between the anchor pin or pins 46 and the rollers 58, 60 differ in the illustrated embodiment, in certain embodiments the distances may be equal despite the offset position of the rollers by, for example, arranging the two anchor pins 46 in FIG. 3 in a corresponding offset relationship. Although the distances from the anchor pin(s) 46 to rollers 58, 60 in FIGS. 2 and 3 differ resulting in asymmetrical forces within the brake 40 or 40', the impact is substantially less than the asymmetrical forces already present in the brake 40 or 40' due to the typical dynamic self-energizing action of the leading brake shoes. The exact position of the rollers 58, 60 may be further optimized to account for friction in the roller journals.

A brake 40 or 40' in accordance with the invention represents an improvement as compared to conventional brakes. In particular, by adjusting the position of the rollers 58, 60 and offsetting the rollers 58, 60, cam 56 applies actuating forces (represented by arrows 118, 120) to rollers 58, 60 and brake shoes 48, 50 in directions perpendicular to plane 114 (and parallel to plane 116). These forces are substantially tangent to the pivot arc of the brake shoes 48, 50 and therefore reduce or eliminate any divergence between the effective brake actuation force and the force applied by the cam 56. As a result, mechanical stress in the brake shoes webs 68 is reduced as well as the resulting downtime and repair costs resulting from web cracking. The actuation efficiency of the brake 40 or 40' is also increased enabling a reduction in the air chamber size for the brake actuator and/or the use of brake linings 72 with lower coefficients of friction. The inventive brake 40 or 40' also allows increased travel of the cam followers 58, 60 and allows the brake shoes 48, 50 to retract further thereby permitting the use of thicker brake linings 72 and improving the life of the brake 40 or 40'.

While the invention has been shown and described with reference to one or more particular embodiments thereof, it will be understood by those of skill in the art that various changes and modifications can be made without departing from the spirit and scope of the invention.

What is claimed is:

1. A brake, comprising:
   a brake spider having a central aperture configured to receive an axle extending therethrough along a center axis of the central aperture;
   first and second brake shoes, each of said first and second brakes shoes having a first end pivotally coupled to said brake spider, said first end of said first brake shoe and said first end of said second brake shoe supported on an anchor pin extending from said brake spider;
   a first circular cam follower disposed at a second end of said first brake shoe;
   a second circular cam follower disposed at a second end of said second brake shoe; and,
   a cam in engagement with said first and second circular cam followers, movement of said cam causing said first and second brake shoes to move between positions of engagement and disengagement with an associated braking surface
   wherein a distance from a center of said anchor pin to a center of said first cam follower is different from a distance from said center of said anchor pin to a center of said second cam follower
   wherein each of said first and second brake shoes includes a web and a brake table supported on said web and wherein a first end of said web defines radially inner and outer recesses configured to receive a corresponding one of said first and second circular cam followers, said web of said first brake shoe receiving said first circular cam follower in said radially outer recess, said web of said second brake shoe receiving said second circular cam follower in said radially inner recess.

2. The brake of claim 1 wherein said radially outer recess in said web of said first brake shoe is disposed further outward radially than said radially inner recess in said web of said second brake shoe.

3. The brake of claim 2 wherein each of said first and second brake shoes includes a brake lining disposed on said brake table.

4. The brake of claim 1 wherein each of said first and second brake shoes includes a brake lining disposed on said brake table.

5. The brake of claim 1 wherein said web of said first brake shoe and said web of said second brake shoe are identical in construction.

6. The brake of claim 1 wherein said cam applies a first actuating force to said first circular cam follower and a second actuating force to said second circular cam follower in directions substantially perpendicular to a plane containing both said center axis and an axis of rotation of said cam.

7. The brake of claim 1 wherein said cam applies a first actuation force to said first circular cam follower in a direction substantially tangent to a pivot arc of said first brake shoe and applies a second actuating force to said second circular cam follower in a direction substantially tangent to a pivot arc of said second brake shoe.

8. The brake of claim 1 wherein said cam comprises an S-cam.

9. The brake of claim 1, further comprising a brake drum defining said braking surface.

10. A brake, comprising:
a brake spider having a central aperture configured to receive an axle extending therethrough along a center axis of the central aperture;
first and second brake shoes, each of said first and second brakes shoes having a first end pivotally coupled to said brake spider, said first end of said first brake shoe and said first end of said second brake shoe supported on an anchor pin extending from said brake spider;
means, in engagement with a second end of said first brake shoe and a second end of said second brake shoe, for moving said first and second brake shoes between positions of engagement and disengagement with an associated braking surface
wherein a distance between a center of said anchor pin and a radially outermost point of engagement between said first brake shoe and said moving means is different from a distance between said center of said anchor pin and a radially outermost point of engagement between said second brake shoe and said moving means
wherein each of said first and second brake shoes includes a web and a brake table supported on said web and wherein a first end of said web defines radially inner and outer recesses configured to receive said moving means, said web of said first brake shoe receiving said moving means in said radially outer recess, said web of said second brake shoe receiving said moving means in said radially inner recess.

11. The brake of claim 10 wherein said moving means applies a first actuation force to a second end of said first brake shoe in a direction tangent to a pivot arc of said first brake shoe and a second actuation force to a second end of said second brake shoe in a direction tangent to a pivot arc of said second brake shoe.

12. A brake, comprising:
a brake spider having a central aperture configured to receive an axle extending therethrough along a center axis of the central aperture;
first and second brake shoes, each of said first and second brakes shoes having a first end pivotally coupled to said brake spider, said first end of said first brake shoe supported on a first anchor pin extending from said brake spider and said first end of said second brake shoe supported on a second anchor pin extending from said brake spider;
a first circular cam follower disposed at a second end of said first brake shoe;
a second circular cam follower disposed at a second end of said second brake shoe; and,
a cam in engagement with said first and second circular cam followers, movement of said cam causing said first and second brake shoes to move between positions of engagement and disengagement with an associated braking surface
wherein a distance from a center of said first anchor pin to a center of said first cam follower is different from a distance from said center of said second anchor pin to a center of said second cam follower
wherein each of said first and second brake shoes includes a web and a brake table supported on said web and wherein a first end of said web defines radially inner and outer recesses configured to receive a corresponding one of said first and second circular cam followers, said web of said first brake shoe receiving said first circular cam follower in said radially outer recess, said web of said second brake shoe receiving said second circular cam follower in said radially inner recess.

13. The brake of claim 12 wherein said radially outer recess in said web of said first brake shoe is disposed further outward radially than said radially inner recess in said web of said second brake shoe.

14. The brake of claim 13 wherein each of said first and second brake shoes includes a brake lining disposed on said brake table.

15. The brake of claim 12 wherein each of said first and second brake shoes includes a brake lining disposed on said brake table.

16. The brake of claim 12 wherein said web of said first brake shoe and said web of said second brake shoe are identical in construction.

17. The brake of claim 12 wherein said cam applies a first actuating force to said first circular cam follower and a second actuating force to said second circular cam follower in directions substantially perpendicular to a plane containing both said center axis and an axis of rotation of said cam.

18. The brake of claim 12 wherein said cam applies a first actuation force to said first circular cam follower in a direction substantially tangent to a pivot arc of said first brake shoe and applies a second actuating force to said second circular cam follower in a direction substantially tangent to a pivot arc of said second brake shoe.

19. The brake of claim 12 wherein said cam comprises an S-cam.

20. The brake of claim 12, further comprising a brake drum defining said braking surface.

21. A brake, comprising:
a brake spider having a central aperture configured to receive an axle extending therethrough along a center axis of the central aperture;
first and second brake shoes, each of said first and second brakes shoes having a first end pivotally coupled to said brake spider, said first end of said first brake shoe supported on a first anchor pin extending from said brake spider and said first end of said second brake shoe supported on a second anchor pin extending from said brake spider;

means, in engagement with a second end of said first brake shoe and a second end of said second brake shoe, for moving said first and second brake shoes between positions of engagement and disengagement with an associated braking surface wherein a distance between a center of said first anchor pin and a radially outermost point of engagement between said first brake shoe and said moving means is different from a distance between said center of said second anchor pin and a radially outermost point of engagement between said second brake shoe and said moving means wherein each of said first and second brake shoes includes a web and a brake table supported on said web and wherein a first end of said web defines radially inner and outer recesses configured to receive said moving means, said web of said first brake shoe receiving said moving means in said radially outer recess, said web of said second brake shoe receiving said moving means in said radially inner recess.

22. The brake of claim 21 wherein said moving means applies a first actuation force to a second end of said first brake shoe in a direction tangent to a pivot arc of said first brake shoe and a second actuation force to a second end of said second brake shoe in a direction tangent to a pivot arc of said second brake shoe.

23. A brake, comprising:

a brake spider having a central aperture configured to receive an axle extending therethrough along a center axis of the central aperture;

first and second brake shoes, each of said first and second brakes shoes having a first end pivotally coupled to said brake spider, said first end of said first brake shoe and said first end of said second brake shoe supported on an anchor pin extending from said brake spider, each of said first and second brake shoes including a web and a brake table supported on said web, said web of said first brake shoe and said web of said second brake shoe identical in construction;

a first circular cam follower disposed at a second end of said first brake shoe, a center of said first circular cam follower coincident with a rotational axis of said first cam follower;

a second circular cam follower disposed at a second end of said second brake shoe, a center of said second circular cam follower coincident with a rotational axis of said second cam follower; and, a cam in engagement with said first and second circular cam followers, movement of said cam causing said first and second brake shoes to move between positions of engagement and disengagement with an associated braking surface wherein a distance from a center of said anchor pin to said center of said first cam follower is different from a distance from said center of said anchor pin to said center of said second cam follower.

24. The brake of claim 23 wherein said first cam follower is symmetric about said rotational axis of said first cam follower and said second cam follower is symmetric about said rotational axis of said second cam follower.

25. The brake of claim 23 wherein said webs of said first and second brake shoes each have a first end defining a recess configured to receive a corresponding one of said first and second circular cam followers, said recess in said web of said first brake shoe disposed further outward radially than said recess in said web of said second brake shoe.

* * * * *